United States Patent
Russ, Sr.

[11] 3,762,779
[45] Oct. 2, 1973

[54] TREAD ELEMENT FOR FLEXIBLE TRACK

[75] Inventor: Paul E. Russ, Sr., Englewood, Colo.

[73] Assignee: The Gates Rubber Company, Denver, Colo.

[22] Filed: Mar. 26, 1971

[21] Appl. No.: 128,429

[52] U.S. Cl. .......................... 305/35 EB
[51] Int. Cl. ............................ B62d 55/24
[58] Field of Search ............ 305/35 EB, 38

[56] References Cited
UNITED STATES PATENTS

| | | | |
|---|---|---|---|
| 3,463,562 | 8/1969 | Svensson | 305/38 |
| 1,807,133 | 5/1931 | Pennington | 305/35 EB |
| 2,899,242 | 8/1959 | Bombardier | 305/38 |
| 1,460,656 | 7/1923 | Kegresse | 305/35 EB |
| 3,582,154 | 6/1971 | Russ | 305/35 EB |
| 3,637,267 | 1/1972 | Bombardier | 305/35 EB |
| 3,612,625 | 10/1971 | Huber | 305/35 EB |
| 3,602,364 | 8/1971 | Maglio | 305/35 R |
| 3,154,351 | 10/1964 | Tucker | 305/35 R |
| 3,285,677 | 11/1966 | Marier | 308/38 |

*Primary Examiner*—Richard J. Johnson
*Attorney*—Raymond Fink, H. W. Oberg, Jr. and Curtis H. Castleman, Jr.

[57] ABSTRACT

An improved tread element for endless flat track of the polymeric type having transverse ribs that form a tread pattern on the outer surface of the track. The tread element forms a nubbin or "button-like" protuberance extending away from or below the ribs. A plurality of upraised protuberances extend away from the tread ribs of the track, and define a plurality of surfaces which enhance transverse and longitudinal traction.

8 Claims, 3 Drawing Figures

PATENTED OCT 2 1973

3,762,779

INVENTOR:
PAUL E. RUSS SR.

BY H. H. Oberg Jr
ATTORNEY

TREAD ELEMENT FOR FLEXIBLE TRACK

BACKGROUND OF THE INVENTION

The invention relates to tracks or threads for wheel substitutes for land vehicles, but more particularly, the invention relates to an improved tread element for a polymeric track.

Tread patterns for endless tracks of polymeric type have undergone development away from that for pneumatic tires. Perhaps this is for two basic reasons. First, it is desirable to have the tracks stiffer transversely than they are longitudinally. Transverse stiffness provides a firm foundation from which an all-terrain-type vehicle may be supported. Longitudinal flexibility permits the track to be wrapped around and between small diameter drive and idler wheels. Consequently, a track tread element must not impair longitudinal flexibility but it may enhance transverse stiffness.

Secondly, the tread pattern must provide traction over soft or loose terrain such as dirt, mud or snow. In meeting traction and transverse stiffness requirements, tracks were developed with tread portions in the form of spaced-apart ribs extending generally across the width of the track. The tread ribs have a multitude of cross-sectional shapes such as semi-oval, triangular or trapezoidal. The tread ribs provide generally good longitudinal traction but little or no transverse traction. Usually, small projections are included between the spaced-apart tread ribs to enhance transverse traction.

While prior art tread designs are generally satisfactory for many terrain conditions, they are somewhat lacking in terms of transverse traction under soft terrain conditions, and also in both transverse and longitudinal traction under packed snow and ice conditions.

SUMMARY OF THE INVENTION

In accordance with the invention, there is provided a tread element, or a plurality thereof, that imparts improved transverse and longitudinal traction to polymeric tracks of the type having spaced-apart transverse oriented tread rib portions formed thereon. The traction or tread element of the invention extends below and longitudinally away from the tread rib as an upraised protuberance. A plurality of tread elements are spaced along each tread rib, and preferably, a plurality of the elements are in longitudinal alignment. The tread elements provide a multitude of small surfaces that enhance longitudinal and lateral traction. Improved traction is provided without impairing longitudinal flexibility of the track.

Accordingly, it is an object of the invention to provide a tread element which improves transverse and longitudinal traction of a track which has a plurality of longitudinally oriented and spaced-apart tread ribs.

Another object of the invention is to provide a track having improved lateral stability when used over terrain such as ice or hard packed snow.

Another object of the invention is to provide a traction element for tracks where the element may be readily formed under known processes as an included part of a tread rib for a polymeric track.

Another object of the invention is to provide a track having improved transverse and longitudinal traction under ice and snow conditions without the inclusion of secondary metal objects such as studs, bolts, cleats or the like.

Still another object of the invention is to provide a tread element which does not impair longitudinal flexibility of a polymeric track having transversely oriented tread ribs.

And another object of the invention is to provide a small tread element that is buttressed by transversely extending tread ribs of a flexible and endless track.

These and other objects or advantages of the invention will become apparent by reviewing the drawings and description thereof wherein.

DESCRIPTION OF PREFERRED EMBODIMENTS

Figure 1:
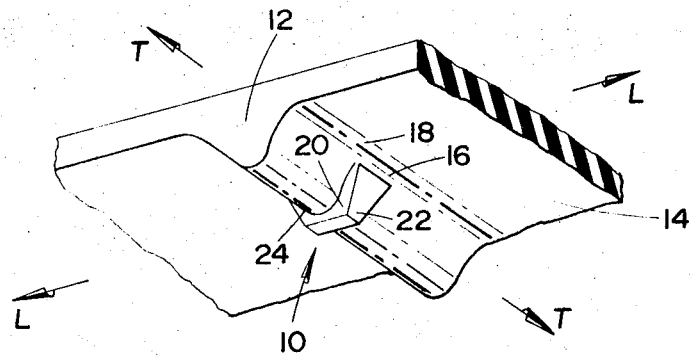
FIG. 1 is an isometric view of a tread element in combination with a transversely oriented tread rib of a polymeric track.

Referring to FIG. 1, a tread element 10 is shown extending from a transversely oriented T—T tread rib 12 of a flexible polymeric track 14. In a preferred embodiment, the tread element 10 is a protuberance or button upraised longitudinally L—L and generally vertically away from the tread rib. Preferably, the tread element is generally frusto-pyramidal in shape and has a rectangular cross-section. The tread element is arranged so the rectangular cross-section is substantially in longitudinal alignment with the track. Optionally, the tread element 10 may have any desired cross-section such as oval, square, triangular, or a combination thereof. Also, the tread element may have any desired alignment in relation to the tread rib. However, the frustro-pyramidal shaped tread element is preferred for reasons which will later be explained. The tread element is small in comparison to the tread rib, but the tread element, is formed with the tread rib by known processes and buttresses the tread element and improves the strength thereof. Preferably, the base 16 of the tread element 10 does not longitudinally extend generally beyond the base 18 of the tread rib 12 because any large extension of the tread element base 16 longitudinally beyond the tread rib base 18 impair longitudinal flexibility of the track 14.

As a protubrance from the tread rib, the tread element 10 defines a plurality of surfaces for enhancing both longitudinal and transverse traction of the track. The longitudinally extending surfaces 20 improve transverse traction and the vertically upraised surfaces 22 below the outer surface 24 of the tread rib 12, improve longitudinal traction, When only improved transverse traction is desired, the height of the tread element is limited so there is no vertically upraised portion below the surface 24 of the tread rib.

Figure 2:
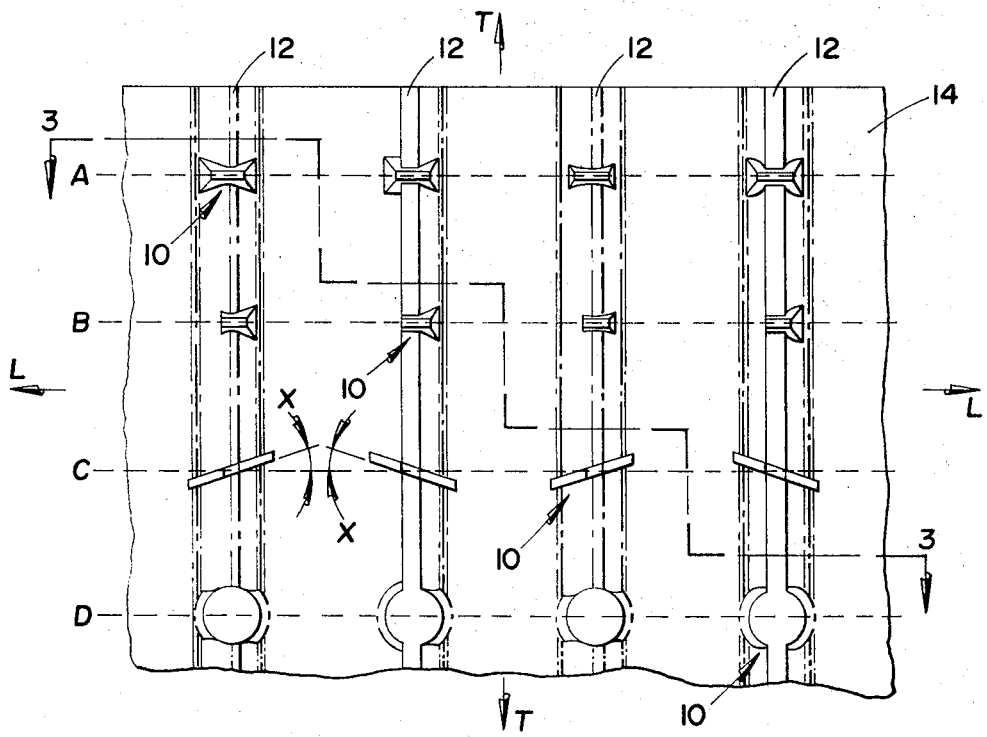
FIG. 2 is a partial plan view of the tread portion of an endless polymeric track including the tread elements of the invention.
Figure 3:
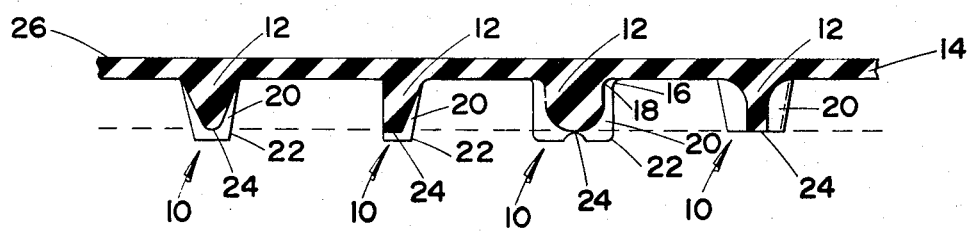
FIG. 3 is a sectional view taken along the lines 3—3 of FIG. 2.

Referring to FIGS. 2 and 3, a plurality of tread elements 10 are upraised from the transversely oriented tread ribs 12 of a flexible polymeric track 14. The tread ribs 12 and tread elements 10 may have a variety of cross-sectional shapes including those which are depicted. Preferably, the tread elements 10 are so arranged that the tread elements of successive tread ribs are in longitudinal alignment L—L for reasons which will later be discussed. The tread elements 10 of longitudinal row A have the same shape as those of FIG. 1. Tread elements 10 of row B are similar to those of row A except that the elements extend in only one longitudinal direction L—L from the tread ribs. Row C is exemplary of a skewed arrangement where the tread elements 10 form at an angle with the longitudinal axis L—L of the track. The skewed tread element may induce small reactionary forces into the track at an angle away from the longitudinal axis of the track. Small forces may cause the track to operate in an unstable or "squirrelly" manner when it is rotated. When skewed rib elements are used, it is preferable to define pairs of tread elements whereby each element of a pair forms an equal but opposite angle X with the longitudinal axis of the track. Pairs of oppositely skewed tread elements induce small but opposite forces into the track which balance each other. Row D depicts frusto-conical tread elements 10 which are not upraised vertically below the outer surface 24 of the thread ribs. Such tread elements impart improved traction only in the transverse direction T—T as there are no upraised surfaces below the tread rib outer surface 24 for longitudinal traction. In each of the tread element examples, a plurality of small traction surfaces 20 are provided which enhance traction of the track in the transverse direction T—T. All of the tread elements with the exception of those in row D, provide a plurality of small traction surfaces 20, 22 which enhance traction of the track and in the longitudinal direction L—L.

It is desirable to have the longitudinal rows A,B,C,D of tread elements located so they are directly under the suspension system of a vehicle on which a track including the invention is employed. For example, if the vehicle has a bogie wheel suspension system, the bogie wheels would run on the inside surface 26 of the track 14 in longitudinal alignment directly over at least one row A,B,C,D of tread elements. If a slide-bar suspension system are used, the slide-bars would engage the inside surface 26 of the track in longitudinal alignment directly over at least one row A,B,C,D of tread elements. The purpose in locating the rows of tread elements in alignment with the vehicle suspension system is to concentrate the vehicle weight directly over a plurality of tread elements. As the vehicle is driven over soft terrain, the vertically upraised surfaces 22 of the tread elements readily enter the terrain and the vehicle is then supported by the entire track. When the vehicle is driven over harder terrain such as packed snow or ice, the tread elements per se support the vehicle. By concentrating the vehicle weight over a row of tread elements, the elements are penetrated into the terrain. Once the elements penetrate hard terrain, the surfaces 20, 22 of the elements react against the terrain which effectively enhances both longitudinal and transverse traction. It has been determined that satisfactory tread element penetration may be accomplished when the cumulative cross-sectional area of the tread elements upraised below the tread rib outer surface 24 does not exceed forty percent of the average cross-sectional area of the tread rib at the base 18. For average weight snowmobiles, it is preferable that the cumulative cross-sectional area of the tread elements be ten percent of the area of the tread rib base. The preferred pyramidal shaped traction element progresses from a small to a larger cross-sectional area. Thus, as a pyramidal shaped traction element engages the terrain, the contact pressure is concentrated to force entry or penetration. Terrain, such as packed snow, adjacent to each pyramidal element is slightly compacted which generally increases the shear forces thereof. The tread elements are then able to react against the compacted terrain to effect even more improved traction.

A track having the tread elements of the invention may be used on a variety of wheel substitute land vehicles such as two or more track all-terrain vehicles or one track snowmobiles. Perhaps the most noticeable improvement in traction occurs where a track including the invention is employed on a typical snowmobile having skis for steering. When a track is operated on a snowmobile over generally compact or soft terrain, such as snow, the tread ribs provide generally sufficient longitudinal traction. The tread elements, being upraised from the tread ribs, provide a plurality of surfaces which react against the terrain to enhance lateral traction for improved stability. The most beneficial result of the invention is realized when the snowmobile is used over semipacked or hard terrain such as packed snow or ice. The tread elements penetrate into the terrain as previously described, enhancing transverse and longitudinal traction. The improvement in transverse traction results in improved handling of the snowmobile. Steering is typically accomplished by turning a pair of skis which support a front portion of the snowmobile. A portion of the snowmobile weight must rest on the skis for steering purposes while the remaining snowmobile weight must be supported by the endless track. Too little weight on the skis reduces their steering effectiveness. Too little weight on the track causes the snowmobile to swerve or "fish-tail," especially at speeds exceeding 30 miles per hour. It has been experimentally determined that when a track including the tread elements of the invention is used on a snowmobile, more vehicle weight may be carried by the skis for improved steering. The plurality of tread elements give the track improved transverse traction. Consequently, a lesser weight may be supported by the track without introducing the problem of "fish-tailing." Snowmobiles utilizing tracks including the invention have been satisfactorily propelled at speeds exceeding 60 miles per hour without serious "fish-tailing" — even though a greater amount of weight is carried by the steering skis.

The foregoing detailed description was made for purpose of illustration only and is not intended to limit the scope of the invention which is to be determined from the appended claims.

What is claimed is:

1. In a flexible and endless track of the polymeric type having a tread formed thereon, the tread including a plurality of spaced apart, integrally molded tread ribs oriented generally transversely in relationship to the track and having a base adjacent the track and an outer surface extending away from the track, the improvement which comprises:
   a plurality of circumferentially spaced integrally molded tread elements upraised and extending at least one direction from adjacent said outer surface and integrally molded with the tread ribs generally longitudinally in relation to the track from the rib a predetermined amount and upraised below the tread rib outer surfaces, the tread elements defining a plurality of surfaces that enhance transverse and longitudinal traction of the track.

2. A track as set forth in claim 1 wherein tread elements of successive tread ribs are longitudinally aligned in relation to the track to define at least one longitudinal row of tread elements.

3. A track as set forth in claim 1 wherein the tread elements are frusto-pyramidal in shape and arranged so the base of the pyramidal shaped tread elements is toward the track.

4. A track as set forth in claim 1 wherein the tread elements have a generally rectangular cross-section and the tread elements are arranged so the long side of the rectangular cross-section is aligned generally longitudinally in relation to the track.

5. A track as set forth in claim 1 wherein the tread elements are divided to define pairs, the tread elements of a pair oppositely skewed at generally equal but opposite angles in relation to the longitudinal axis of the track.

6. A track as set forth in claim 1 wherein the cumulative cross-sectional area of the tread elements which are upraised below a tread rib is no more than forty percent of the area of the tread rib base.

7. A track as set forth in claim 1 wherein the cumulative cross-sectional area of the tread elements which are upraised below a tread rib is generally ten percent of the tread rib base.

8. A track as set forth in claim 1 wherein the tread elements have a generally oval cross-section.

* * * * *